Jan. 14, 1964   H. E. FRITZ ETAL   3,117,597
JET ENGINE STARTER HOSE
Filed May 19, 1960

INVENTORS
HARRY E. FRITZ
RAYMOND A. GALLAGHER
FREDERICK M. GALLOWAY
RICHARD M. KERR
FRANK B. PLUMB
GODFREY J. RITTENHOUSE
ROBERT H. SINNAMON
BY
ATTORNEY

United States Patent Office 3,117,597
Patented Jan. 14, 1964

3,117,597
JET ENGINE STARTER HOSE
Harry E. Fritz, Philadelphia, Pa., Raymond A. Gallagher, Gibbsboro, N.J., Frederick M. Galloway and Richard M. Kerr, Langhorne, Pa., Frank B. Plumb, Haddonfield, N.J., Godfrey J. Rittenhouse, Feasterville, and Robert H. Sinnamon, Huntingdon Valley, Pa., assignors to H. K. Porter Company, Inc., Pittsburgh, Pa., a corporation of Delaware
Filed May 19, 1960, Ser. No. 30,126
4 Claims. (Cl. 138—125)

This invention relates to heat resistant flexible nonmetallic hose, and especially to hose of the kind mentioned in the application, Serial No. 744,580, now Patent Number 3,073,353, of Godfrey J. Rittenhouse, one of the present inventors, for United States Letters Patent for Abrasion Resistant Ventilating Jacket for Jet Engine Starter Hoses, the said jacket being suitable for use with the hose herein disclosed.

Aircraft jet engines are commonly activated by injecting hot air into them at high velocity through ports provided for the purpose to which flexible hose is connected to conduct the air from a suitable source such as a motor vehicle or trailer carrying appropriate generating apparatus.

Heretofore the hose has been made of heat resistant elastomeric materials of the silicone type reinforced with a heavy woven fabric outer jacket of the structural characteristics of the woven cotton jackets commonly used for fire hose but made of yarns comprising fibers of a polyester terephthalate such as "Dacron" marketed by E. I. du Pont de Nemours Company of Wilmington, Delaware. Such hose, however, deteriorates rapidly at temperatures exceeding 500° F. whereas air heated to 615° F. or more is now being employed for jet engine starting.

It is a principal object of this invention therefore to provide a flexible hose capable without excessive deterioration of conducting air heated to 615° F. or higher for long periods, or for relatively indefiniely repeated shorter ones which are more usual in jet engine starting service.

A further object is to provide a hose comprising a heat resistant elastomeric inner lining and a strong outer reinforcement of textile fabric with heat insulating intermediate layers disposed between them whereby the outer reinforcement preferably comprising Dacron yarn is protected from excessive heating during passage of highly heated air through the hose.

Other objects, purposes and advantages of the invention will hereafter more fully appear or will be understood from the following description in which reference will be had to the accompanying drawing wherein.

Figure 1:
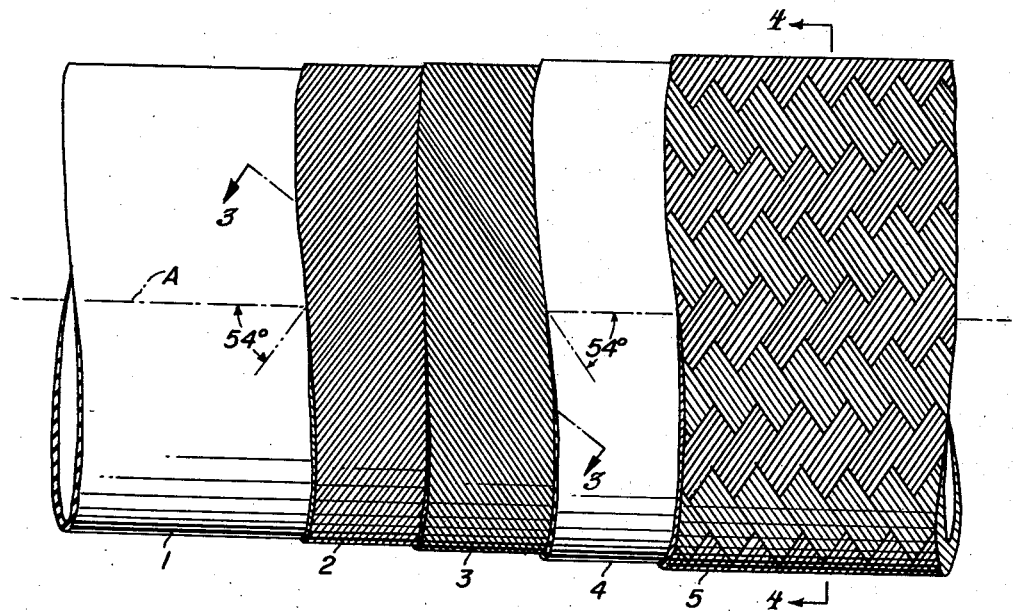
FIG. 1 is a fragmentary side elevation with successive layers broken away of a starter hose embodying the invention.

Referring now more particularly to the drawing, the hose as shown therein comprises a plurality of layers each having special characteristics conjointly contributing to the capacity of the hose as a whole to serve its intended function, including an elastomeric inner lining layer 1, intermediate heat insulating layers 2, 3, an outer elastomeric layer 4 and an outer fabric reinforcing layer 5 each of which, individually, will now be described in conjunction with disclosure of a preferred method of making the hose.

The tubular inner lining layer 1 of a highly heat resistant silicone elastomer or the like, is preferably seamlessly extruded in the uncured state and partially cured in any convenient manner as by subjecting it to about 268° F. for 20 minutes. Then a length of this tube, say 30' or 60' long and about 3½" I.D. with wall thickness about 0.0625", is placed about a cylindrical mandrel M, preferably a hollow metal one of at least corresponding length and diameter to snugly fit in the tube having end closures (not shown) equipped for circulation of live steam under considerable pressure through its interior. For convenience the mandrel, carrying the fully or partially curved tube 1 is mounted in a lathe or other apparatus whereby it can be rotated while the first insulating layer 2 of a material hereafter more fully described is wound helically on tube 1 as a strip the width of which is so adjusted to the outer diameter of the tube that when successive convolutions of the strip substantially abut, their opposed edges define a helix making an angle of approximately 54° with respect to the axis A of the mandrel as indicated in FIG. 1.

Next a strip of like material is wound in substantially the same manner over the first to form the second insulating layer 3 which, however, is spiraled to the opposite hand, i.e., so that its substantially abutting edges define a helix of opposite angularity. These strips are preferably applied in such manner that the warp yarns in the strip which forms layer 2 are substantially devoid of crimp due principally to the extremely small diameter and relatively wide spacing of its filler yarns, which in most instances are inadjacent convolutions in offset relation (FIG. 5), while the warp yarns in the strip which forms layer 3 enclose those in layer 2 and are likewise substantially devoid of crimp (FIG. 3) thereby, due principally to the extremely small diameter and wide spacing of the filler yarns, eliminating the short radius bends in the warp yarns of ordinary woven fabric formed at points at which warp and filler yarns are crossed. There is then applied over layer 3 uncured heat resistant silicone elastomer either as a helically wound strip or as a butt jointed sheet to form layer 4 over which there is braided with the aid of a braider of usual type Dacron yarn to form fabric reinforcing layer 5.

The yarns for reinforcing layer 5 are desirably primed with a thin solution of silicone and wound on the bobbins of the braider in groups of six for braiding as strips or flat warps forming on the surface of the hose a pattern of reinforcement resembling a coarse twill weave, the relatively heavy 4-ply high twist yarns being maintained under tension preferably of 6–9 lbs. thus tending to imbed them somewhat in the surface of the underlying uncured elastomeric layer 4 to which they become intimately bound during a subsequent operation.

After braiding on reinforcing layer 5 there is applied temporarily and under tension a wrapping of nylon or other suitable tape (not shown) to exert radial inward or centripetal pressure on the reinforcement and hence all other underlying layers, and live high pressure steam or other suitable heating medium is introduced to the interior of the mandrel to heat it preferably to about 300° F. which temperature is maintained for about an hour or such other time as may be required to complete the curing of the elastomeric components of the hose.

The pressure of the temporary tape wrapping against the outer Dacron reinforcement during this curing step while the underlying silicone is relatively soft in conjunction with the heat-induced shrinking of the Dacron yarns causes the latter to become substantially embedded in or impregnated with the silicone, which at points exudes through the fabric forming a virtually inseparable bond therewith while the same forces tend to bond firmly together all other hose components into a unitary whole.

After the curing has been completed the heating is discontinued, the temporary tape removed, and the hose, first artificially cooled if preferred, is withdrawn from the mandrel, its ends are trimmed square and end couplings applied to enable it to be placed in service.

Figure 2:
FIG. 2 is a fragmentary diagrammatic much enlarged plan view of a coated fabric used in making the hose.
Figure 3:
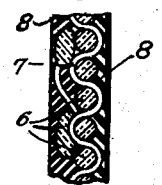
FIG. 3 is a fragmentary much enlarged section showing the relationship of the warp and filler yarns in certain fabric layers of the hose corresponding to a section on line 3—3 in FIG. 1 and with the relative thickness of the elastomeric impregnant of the fabric considerably exaggerated.
Figure 4:
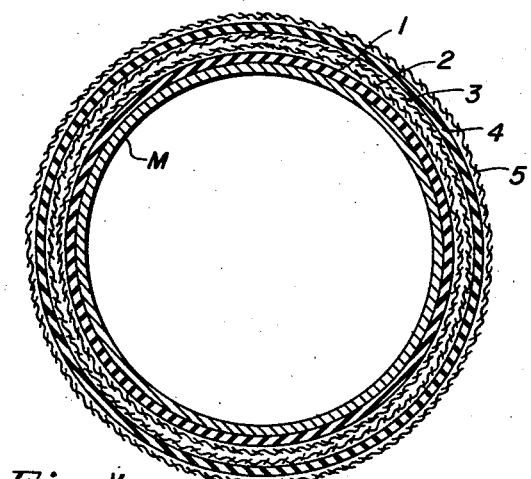
FIG. 4 is a transverse section of the hose on line 4—4 in FIG. 1, relative thicknesses being exaggerated to some extent in all said figures.
Figure 5:
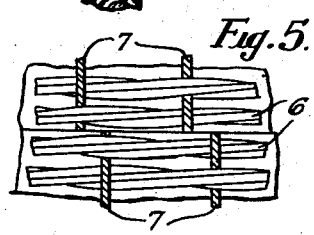
FIG. 5 is an enlarged fragmentary view corresponding to FIG. 2 but showing a typical abutting relationship of two adjacent areas of such fabric in the hose.

Reference has herein been made to the fabric of which intermediate insulating layers 2, 3 are composed and which is represented on magnified scale in FIGS. 2, 3 and 5. As shown therein it comprises relatively large diameter 3-ply low twist warp yarns 6 connected together by relatively widely spaced and considerably smaller diameter filler yarns 7. The warp yarns 6 are made of glass or other refractory inorganic fibers while the small filler yarns 7 may be single ply low twist Dacron or other organic thread interwoven with the warp yarns in a weave comparable to that of standard tire cord fabric in which, as in the glass-Dacron fabric we employ, the filler yarns are only just strong enough and appropriately spaced to hold the warp yarns closely together without imparting material transverse tensile strength to the fabric or appreciably crimping the inorganic fiber warp yarns, among which the filler yarns are sinuously interlaced as illustrated in FIG. 3 while the warp yarns remain substantially rectilinear and parallel.

For preparing the strips used to form layers 2, 3 of the hose a fabric of the kind just described first primed with a suitable silicone primer is coated with about 0.0625" of an uncured silicone type heat resistant elastomer, preferably by a skimming operation in which the elastomer is calendered under pressure onto one surface of the fabric as it passes through calendering rolls whereby the fabric becomes permeated with the elastomer which protrudes into the fabric interstices from that face to which it is initially applied to or almost to the opposite face, being represented by the elastomeric material 8 in the fabric illustrated particularly in FIG. 3. This material is produced in lengths sufficient to extend in a single uninterrupted helix from end to end of the hose whereby as the glass fibers in the warp yarns are desirably of the "continuous filament" type, each of layers 2, 3 comprises a multiplicity of glass fibers extending helically the full length of the hose.

The Dacron relatively finer filler yarns 7 (not shown in FIG. 1) as noted, primarily function to hold the warp yarns together laterally, a function no longer so essential after the fabric has been calendered to the elastomeric material 8, and when the hose in which they are incorporated is subjected to intense heat they either fuse and thus conform to the shape of the glass warp yarns with which they are interwoven, or substantially disappear. This materially contributes to the serviceability of the hose since in all-glass-fiber woven fabrics failures occur principally at the points at which the warp and filler yarns cross and result from bending of the relatively brittle component fibers beyond their elastic limits. With filler yarns of Dacron, however, initial severe bending of the glass fibers in the warp yarns is minimized and later eliminated when the Dacron is heated to fusion during testing or, at the latest, shortly after the hose has been placed in service.

These closely spaced glass fibers are heat resistant and relatively non-conducting in respect to heat so that hose made as herein described will convey air heated to 615° F. virtually indefinitely without attaining a skin temperature in excess of about 325° F. which is well within the capacity of the Dacron of the outer reinforcement to withstand without appreciable loss of tensile strength.

The silicone coating skimmed on the strips forming layers 2, 3 is usually faced inwardly in both layers although obviously both may be faced outwardly or oppositely faced if desired, while in some instances glass-Dacron fabric skimmed on both faces may be used. It is preferable, however, the opposed helices of glass fibers be separated only by a thin film of the silicone elastomer impregnant to avoid abrasive contact between them and they can thus contribute substantially to the bursting strength of the hose without impairing its flexibility; adjacent individual yarns in each layer are isolated from each other and protected against internal abrasion by the elastomer forced between them during the skimming operation.

While we have herein illustrated and described with considerable particularity a preferred embodiment of our hose produced from certain materials by the practice of the specific steps set forth in detail herein, we do not desire or intend thereby to be limited or confined thereto or thereby in any way, as the characteristics of our hose are substantially independent of the specific procedures employed in its manufacture which may differ in principle and in detail from those we conveniently employ, while changes and modifications in the form, construction, composition, relationship and arrangement of the several components of our hose will readily occur to those skilled in the art and may be utilized if desired without departing from the spirit and scope of the invention as defined in the appended claims.

Having thus described our invention, we claim and desire to protect by Letters Patent of the United States:

1. A hose comprising a silicone elastomer tubular member, a layer of silicone-elastomer-impregnated fabric superposed thereon, said fabric having low twist inorganic fiber warp yarns extending helically of and contacting and enclosing said member substantially throughout the extent of said warp yarns, relatively widely spaced extremely small-diameter fusible organic fiber filler yarns interwoven with said warp yarns substantially normal thereto and undulating among the latter, a second layer of like fabric superposed on the first layer with its warp yarns extending in a helix of opposite hand to the warp yarns of the first layer and contacting and enclosing said first layer substantially throughout the extent of said warp yarns of said second layer, the filler yarns of the second layer similarly undulating among its warp yarns, a layer of silicone elastomer superposed on said second fabric layer, an outer reinforcing layer comprising heat shrinkable organic fiber yarns braided about and partially embedded in said last mentioned silicone elastomer layer and partially exposed on the outer surface thereof, all said elastomeric components of the hose being polymerized into an integral whole.

2. A hose as defined in claim 1 in which said inorganic warp yarns comprise glass fibers and the organic filler yarns interwoven therewith comprise fibers of a polyester terephthalate.

3. A hose as defined in claim 1 in which the yarns of said outer reinforcing layer comprise fibers of a polyester terephthalate.

4. A hose as defined in claim 1 in which the inorganic fiber warp yarns are multiple-ply low twist yarns each of which substantially parallels adjacent warp yarns in the fabric.

(References on following page)

References Cited in the file of this patent

UNITED STATES PATENTS

| | | | |
|---|---|---|---|
| 1,973,756 | Gish | Sept. 18, | 1934 |
| 2,044,887 | Laguidara | June 23, | 1936 |
| 2,128,814 | Gish | Aug. 30, | 1938 |
| 2,482,702 | Billmeyer | Sept. 20, | 1949 |
| 2,512,433 | Leben | June 20, | 1950 |
| 2,539,853 | Myers et al. | Jan. 30, | 1951 |
| 2,652,093 | Burton | Sept. 15, | 1953 |
| 2,763,316 | Stahl | Sept. 18, | 1956 |
| 2,833,313 | Penman | May 6, | 1958 |
| 2,855,975 | Ritchie et al. | Oct. 4, | 1958 |
| 2,906,638 | Herman | Sept. 29, | 1959 |
| 2,930,406 | Galloway | Mar. 29, | 1960 |
| 2,943,644 | Moseley | July 5, | 1960 |

FOREIGN PATENTS

| | | |
|---|---|---|
| 407,823 | France | Jan. 8, 1910 |